United States Patent [19]

Kucherer et al.

[11] 4,390,042
[45] Jun. 28, 1983

[54] TUBE PLUG

[75] Inventors: Harvey D. Kucherer, Monroeville; Ralph W. Kugler; Stuart L. Rieben, both of Mt. Lebanon; John J. Wilhelm, New Kensington; Mark E. Wylie, Monroeville, all of Pa.

[73] Assignee: Westinghouse Electric Corp., Pittsburgh, Pa.

[21] Appl. No.: 173,550

[22] Filed: Jul. 30, 1980

[51] Int. Cl.³ ............................................. F16L 55/12
[52] U.S. Cl. ........................................ 138/89; 165/71; 29/523
[58] Field of Search ................. 138/89; 220/234, 237; 165/71, 76; 29/523

[56] References Cited

U.S. PATENT DOCUMENTS

| | | | |
|---|---|---|---|
| 2,092,358 | 9/1937 | Robertson | 138/97 X |
| 3,135,414 | 6/1964 | Lee | 138/89 X |
| 3,525,365 | 8/1970 | Meulendyk et al. | 138/89 |
| 3,691,609 | 9/1972 | Ice et al. | 138/89 X |
| 4,091,841 | 5/1978 | Beneker et al. | 138/89 |

Primary Examiner—James E. Bryant, III

Attorney, Agent, or Firm—L. A. DePaul; Z. L. Dermer

[57] ABSTRACT

The tube plug comprises a shell having a tapered inner surface against which an externally tapered expander member moves by application of a pulling force. The motion of the expander member relative to the shell causes the shell to expand into contact with a heat exchange tube thereby plugging the tube. The expander member is formed from a hardened metal with tangentially blended leading radius and a self-locking trailing edge which provides for ease in expanding the shell while preventing inadvertent unlocking of the plug. The shell has a substantially uniform wall thickness throughout the portion of the shell which experiences expansion so that the force necessary to perform the expanding process does not increase beyond the strength limitations of the installation equipment as the expander member is moved through the shell. The shell also has a plurality of lands on the outside surface thereof whose depth increases from closed end to open end of the shell so that a uniform wall thickness can be maintained in that region while allowing the lands to contact the inner surface of the heat exchange tube.

10 Claims, 4 Drawing Figures

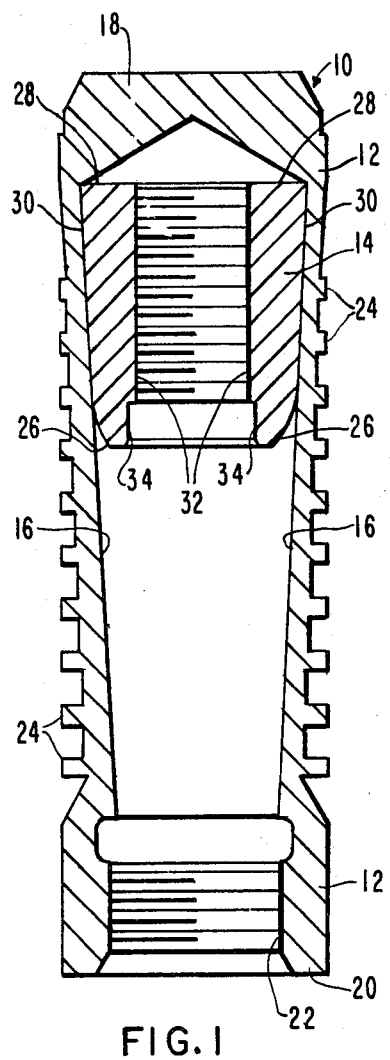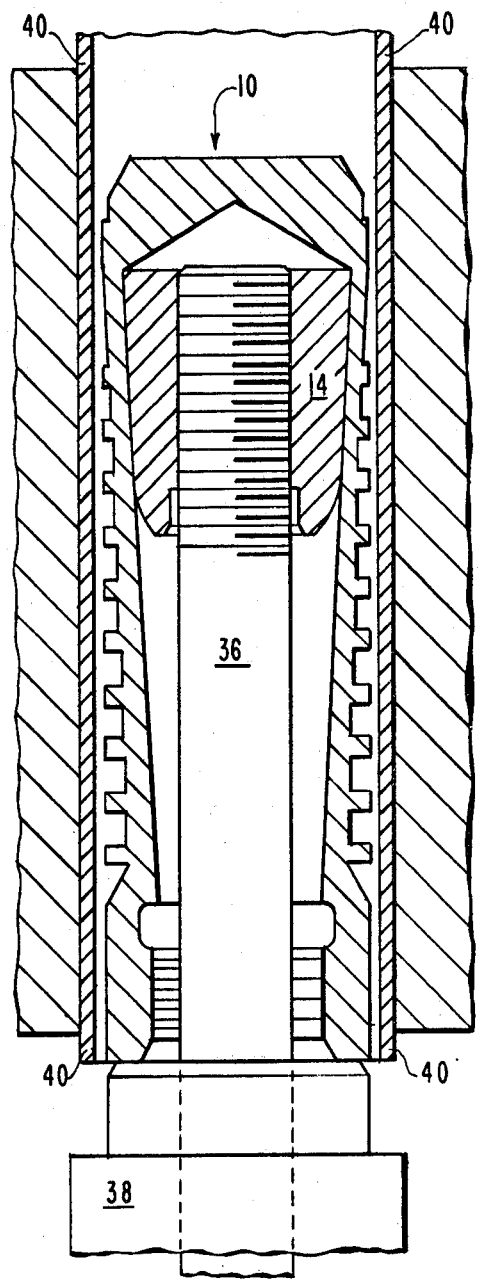
FIG. 1
FIG. 2

TUBE PLUG

CROSS-REFERENCE TO RELATED APPLICATIONS

This invention is related to copending U.S. patent application Ser. No. 129,538 entitled "Plug Removal Apparatus" filed Mar. 23, 1980 in the name of W. F. Nanstiel et al. and to copending U.S. patent application Ser. No. 173,551 entitled "Tube Plug" filed herewith in the name of H. D. Kucherer both of which are assigned to the Westinghouse Electric Corporation.

BACKGROUND OF THE INVENTION

This invention relates to tube plugs and more particularly to apparatus for plugging heat exchanger tubes.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak either is impending or occurs therein which allows the two fluids to mingle. When this occurs, is is sometimes necessary to plug the tube so that the fluid does not flow through the tube thereby preventing leakage from the tube.

In nuclear reactor power plants, the tube-type heat exchangers are commonly referred to as steam generators. When a defect occurs in the tubes of a nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube is plugged so that the coolant is not permitted to flow through the tube. This prevents contamination of the fluid surrounding the tubes.

There are several kinds of plugs that may be used to plug the heat exchange tubes. One such device used to plug heat exchange tubes in nuclear steam generators is an explosive plugging device. With the explosive plugging devices, a metal plug is inserted in the heat exchange tube with an explosive contained within the plug. When the explosive is detonated, the plug is forced into close contact with the inside of the tube, thus blocking flow through the tube. One problem associated with explosive plugging is that should it become necessary to replace the defective tube or defective plug, the explosive plug must be removed by machining methods which is a time consuming procedure.

There are also several kinds of mechanical plugs that can be used to plug heat exchange tubes which do not use explosives. However, these mechanical plugs suffer from defects such as not being as leak tight as necessary, difficult to remove from a tube, difficult to install in a tube, or require assembly in the field. Since tube plugs to be used in a nuclear reactor environment must be easily installable, leak tight, and easily removable, the mechanical plugs known in the prior art are generally not acceptable for use in nuclear steam generators. Therefore, what is needed is a mechanical plug that is capable of being quickly and easily installed in a heat exchange tube of a nuclear steam generator for preventing the flow of reactor coolant therethrough.

SUMMARY OF THE INVENTION

The tube plug comprises a shell having a tapered inner surface against which an externally tapered expander member moves by application of a pulling force. The motion of the expander member relative to the shell causes the shell to expand into contact with a heat exchange tube thereby plugging the tube. The expander member is formed from a hardened metal with tangentially blended leading radius and a self-locking trailing edge which provides for ease in expanding the shell while preventing inadvertent unlocking of the plug. The shell has a substantially uniform wall thickness throughout the portion of the shell which experiences expansion so that the force necessary to perform the expanding process does not increase beyond strength limitations of installation equipment as the expander member is moved through the shell. The shell also has a plurality of lands on the outside surface thereof whose depth increases from closed end to open end of the shell so that a substantially uniform wall thickness can be maintained in that region while allowing the lands to contact the inner surface of the heat exchange tube.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is a cross-sectional view of the tube plug;

FIG. 2 is a cross-sectional view in elevation of the tube plug, installation apparatus, and heat exchange tube;

DESCRIPTION OF THE PREFERRED EMBODIMENT

Figure 3:
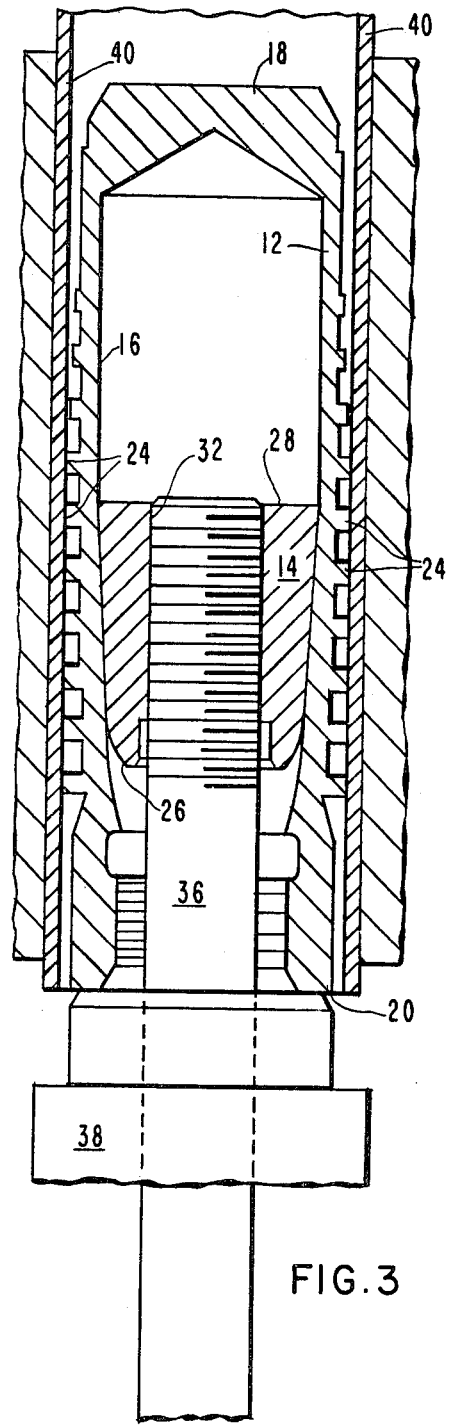
FIG. 3 is a cross-sectional view in elevation of the tube plug and installation apparatus in the expanded position.

Due to defects that sometimes occur in heat exchange tubes, it is occasionally necessary to plug the heat exchange tube. The invention described herein provides a mechanical tube plug for effectively plugging a tube in a heat exchanger and thus preventing circulation of a fluid through the heat exchange tube.

Referring to FIG. 1, the tube plug is referred to generally as 10 and comprises a shell 12 and an expander member 14. Shell 12 may be a substantially cylindrical member manufactured from a metal such as Inconel. Shell 12 has a conical inner surface 16 which has a larger diameter at the closed end 18 and a smaller diameter at the open end 20. Inner surface 16 is arranged such that expander member 14 is captured within shell 12 so that movement of expander member 14 relative to inner surface 16 causes shell 12 to expand without allowing expander member 14 to be removed from shell 12. Shell 12 also has a threaded bore 22 near open end 20 which has a diameter larger than the smallest diameter of inner surface 16 which allows apparatus to be inserted through threaded bore 22 and into the interior of shell 12. Shell 12 also has a substantially uniform wall thickness in the portion of shell 12 that is expanded by expander member 14. In this portion of shell 12 the wall thickness does not vary by substantially more than ±10% of the nominal wall thickness which allows for a somewhat uniformly increasing pulling force to expand shell 12 by expander member 14. In addition, a plurality of lands 24 are formed on the outside surface of shell 12 in a manner such that the height of each land 24 increases from closed end 18 to open end 20 while the outer surfaces of all lands 24 are maintained at approximately the same external diameter and while the wall thickness of shell 12 remains substantially constant throughout the portion of shell 12 wherein lands 24 are located. Shell 12 is also constructed such that the area near open end 20 has a thicker wall section than the remainder of shell 12 to provide stability in extracting tube plug 10.

Still referring to FIG. 1, expander member 14 may be manufactured from a hardenable metal such as stainless steel alloy Carpenter 455 and is formed such that it has a leading end 26 which has a tangentially blended radius that minimizes "plowing" or pushing metal ahead of expander member 14 when expander member 14 is pulled through shell 12. A lubricant such as graphite suspended in alcohol may be applied to expander member 14 to aid in its sliding movement. Expander member 14 may also have a polished exterior surface that enhances its movement relative to shell 12. Expander member 14 also has a trailing edge 28 which is formed to have a sharp edge such that it provides a self-locking mechanism. The sharp edge feature of trailing edge 28 restrains expander member 14 from moving toward closed end 18 of shell 12, thereby preventing inadvertent diametral contraction of shell 12. However, the construction of expander member 14 is such that the sharp edge feature of trailing edge 28 does not prevent expander member 14 from being pushed toward closed end 18 by a plug removal tool. Expander member 14 is also provided with a conical outer surface 30 that is arranged such that its outside diameter is smaller near leading edge 26 and larger near trailing edge 28. The shape of outer surface 30 provides a mechanism for expanding shell 12 when expander member 14 is moved relative to shell 12. Expander member 14 also has internal threads 32 which can be used for gripping expander member 14 during the expansion process. In addition, a counterbore 34 is provided near the end of expander member 14 which prevents expander member 14 from gripping the pulling device too tightly.

OPERATION

Figure 4:
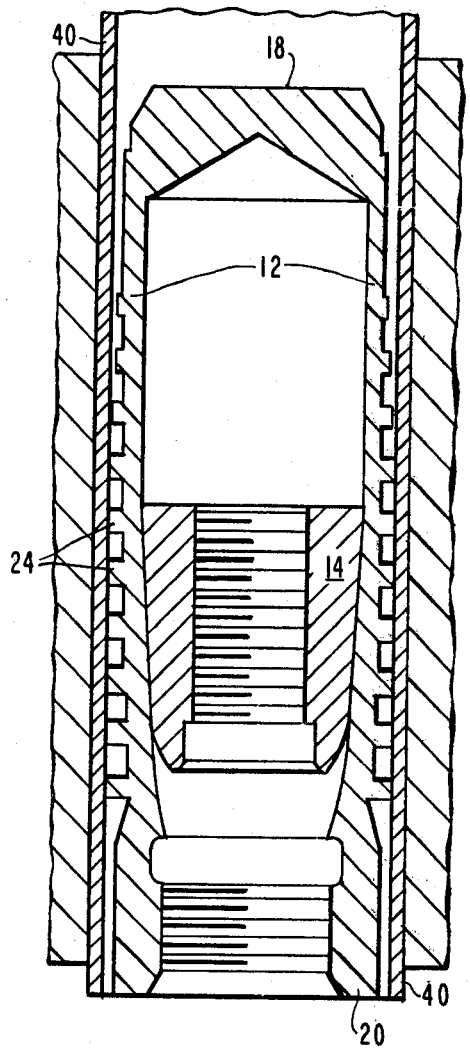
FIG. 4 is a cross-sectional view in elevation of the tube plug in a heat exchange tube in the expanded position.

Referring now to FIGS. 2, 3, and 4, when inserting a tube plug 10 in a heat exchange tube of a nuclear steam generator, it is imperative that tube plug 10 be capable of being inserted therein in a quick and efficient manner due to the radioactive nature of the environment. Therefore, before workmen enter the steam generator, draw bar 36 which is attached to hydraulic cylinder 38 chosen from those well known in the art is threaded into internal threads 32 of expander member 14. In this position, hydraulic cylinder 38 is in contact with open end 20 of shell 12 and draw bar 36 is in contact with expander member 14. Workmen then insert tube plug 10 into heat exchange tube 40 as shown in FIG. 2. When in this position, tube plug 10 fits easily but snugly into heat exchange tube 40. Next, hydraulic cylinder 38 is activated to exert a force of approximately between 12,000 lb. and 22,000 lb. which causes draw bar 36 to be moved toward hydraulic cylinder 38 and which in turn pulls expander member 14 relative to shell 12 as shown in FIG. 3. Since shell 12 is being restrained by hydraulic cylinder 38, the relative motion of expander member 14 may be accomplished by the single action of draw bar 36.

As shown in FIG. 3, the relative movement of expander member 14 with respect to inner surface 16 causes shell 12 to expand until lands 24 contact heat exchange tube 40. The tangentially blended radius of leading end 26 allows for a smooth movement of expander member 14. As expander member 14 is moved relative to shell 12, the metal in the wall of shell 12 tends to flow around the corner of trailing edge 28 of expander member 14 such that inadvertent backward motion of expander member 14 is lessened which provides a self-locking feature. Once tube plug 10 has been expanded, draw bar 36 may be unthreaded from expander member 14 and removed which results in tube plug 10 being in the locked position as shown in FIG. 4.

When in the locked position a plurality of lands 24 are impressed in the wall of heat exchange tube 40. Lands 24 thereby establish a type of labyrinth seal along the inner surface of heat exchange tube 40 which prevents fluid from flowing therethrough. Moreover, since shell 12 has a closed end 18 there is no potential leak path through tube plug 10 which is not the case in many tube plugs having more than one part.

It has been found that during the locking process typical expander members may tend to grip drawbar 36 so tightly that subsequent removal of drawbar 36 may be extremely difficult. The present invention circumvents this problem by using a hardenable stainless steel alloy such as Carpenter 455 and having counterbore 34 arranged near the end of internal threads 32 so that drawbar 36 may be unthreaded from internal threads 32 even though expander member 14 is experiencing compressive stresses.

When it becomes necessary to remove tube plug 10 from heat exchange tube 40, a plug removal apparatus such as that described in copending United States Patent Application Ser. No. 129,538, entitled "Plug Removal Apparatus" filed in the name of W. F. Nanstiel et al. may be used to move expander member 14 to its initial position as shown in FIG. 1. Moving expander member 14 to its initial position relieves stress on shell 12 which relieves pressure between lands 24 and heat exchange tube 40 thereby allowing tube plug 10 to be removed from heat exchange tube 40. Once expander member 14 has been moved to near the closed end 18 of shell 12, a device may be threaded into internal threads 22 for pulling tube plug 10 from heat exchange tube 40. An important advantage in having threaded bore 22 near open end 20 arises from the fact that when tube plug 10 is pulled from heat exchange tube 40 in the extraction process, the pulling action tends to elongate the tube plug 10 which simultaneously causes a reduction in diameter of tube plug 10 thereby facilitating the extraction process. The uniform wall thickness of tube plug 10 along the portion of tube plug 10 that contacts heat exchange tube 40 provides for a relatively uniform axial stress during the extraction process which also facilitates the removal of tube plug 10.

Therefore, it can be seen that the invention provides a mechanical tube plug capable of being quickly and easily installed in a heat exchange tube of a nuclear steam generator that is both leak-tight and easily removable.

We claim as our invention:

1. A tube plug for preventing flow through tubes comprising:

a substantially cylindrical shell having one closed end and one open end with said shell having a substantially uniform wall thickness throughout the portion of said shell that contacts said tube and throughout the portion of said tube that is expanded and having a conical inner surface with said conical inner surface having a smaller inside diameter near said open end and having a larger inside diameter near said closed end;

an expander member having a conical outer surface and slidably disposed in said shell with the smaller end of said expander member being arranged nearer said open end of said shell such that said expander member is captured within said shell for expanding said shell when said expander member is moved toward said open end of said shell; and a plurality of lands formed on the outside surface of said shell with said lands all having approximately the same outside diameter and with said lands increasing in height from said closed end to said open end for contacting the inside surface of said tube when said shell is expanded by said expander member thereby establishing a seal between said tube and said shell.

2. The tube plug according to claim 1 wherein said expander member is a hardenable steel member.

3. The tube plug according to claim 2 wherein said expander member has a tangentially blended radius on its leading edge for facilitating sliding within said shell.

4. The tube plug according to claim 3 wherein said expander member has a trailing edge formed in a sharp edge for preventing inadvertent backward movement of said expander member relative to said shell.

5. The tube plug according to claim 4 wherein said shell has a threaded bore near said open end for engaging extraction apparatus.

6. The tube plug according to claim 5 wherein said expander member has internal threads therein for engaging a pulling device.

7. The tube plug according to claim 6 wherein said expander member has a counterbore therein arranged near said internal threads for preventing excessive gripping by said expander member.

8. A tube plug for preventing flow through tubes comprising:

a substantially cylindrical shell having one closed end and one open end with said shell having a threaded bore near said open end for engaging extraction apparatus and having a conical inner surface with said conical inner surface having a smaller inside diameter near said open end and having a larger inside diameter near said closed end;

an expander member having a conical outer surface and slidably disposed in said shell with the smaller end of said expander member being arranged nearer said open end of said shell such that said expander member is captured within said shell for expanding said shell when said expander member is moved toward said open end of said shell; and a plurality of lands formed on the outside surface of said shell with said lands increasing in height from said closed end to said open end for contacting the inside surface of said tube when said shell is expanded by said expander member thereby establishing a seal between said tube and said shell.

9. The tube plug according to claim 8 wherein said expander member has internal threads therein for engaging a pulling device.

10. The tube plug according to claim 9 wherein said expander member has a counterbore therein arranged near said internal threads for preventing excessive gripping by said expander member.

* * * * *